(12) United States Patent
Liu et al.

(10) Patent No.: US 9,542,054 B2
(45) Date of Patent: Jan. 10, 2017

(54) TOUCH MODULE AND MANUFACTURING METHOD THEREOF

(71) Applicant: TPK Touch Solutions Inc., Taipei (TW)

(72) Inventors: Chen-Yu Liu, Taoyuan (TW); Lu-Hsing Lee, Taoyuan (TW); Cheng-Chieh Chang, Taoyuan (TW); Huai-San Ku, Taipei (TW)

(73) Assignee: TPK Touch Solutions Inc., Taipei (TW)

( * ) Notice: Subject to any disclaimer, the term of this patent is extended or adjusted under 35 U.S.C. 154(b) by 37 days.

(21) Appl. No.: 14/720,995

(22) Filed: May 26, 2015

(65) Prior Publication Data

US 2015/0346853 A1 Dec. 3, 2015

(30) Foreign Application Priority Data

May 30, 2014 (CN) .......................... 2014 1 0240249

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 2203/04103* (2013.01); *G06F 2203/04111* (2013.01)

(58) Field of Classification Search
CPC ........................................... G06F 3/041–3/044
See application file for complete search history.

(56) References Cited

U.S. PATENT DOCUMENTS

| | | | | |
|---|---|---|---|---|
| 9,057,653 | B2* | 6/2015 | Schediwy | G01L 1/146 |
| 9,367,194 | B2* | 6/2016 | Edwards | G06F 3/044 |
| 2009/0085885 | A1* | 4/2009 | Wu | G06F 3/041 |
| | | | | 345/173 |
| 2011/0278078 | A1* | 11/2011 | Schediwy | G01L 1/146 |
| | | | | 178/18.06 |
| 2011/0279402 | A1* | 11/2011 | Yoo | G06F 3/044 |
| | | | | 345/174 |
| 2012/0019473 | A1* | 1/2012 | Edwards | G06F 3/044 |
| | | | | 345/174 |
| 2012/0081328 | A1* | 4/2012 | Kandziora | G06F 3/0412 |
| | | | | 345/174 |
| 2013/0215035 | A1* | 8/2013 | Guard | G06F 3/0221 |
| | | | | 345/168 |
| 2015/0077646 | A1* | 3/2015 | Chen | G06F 3/0418 |
| | | | | 349/12 |

(Continued)

*Primary Examiner* — Patrick F Marinelli
(74) *Attorney, Agent, or Firm* — Cooper Legal Group, LLC

(57) ABSTRACT

A touch module and a manufacturing method thereof are disclosed. The touch module includes a substrate, at least two first touch electrodes, at least two second touch electrodes, at least one conductive residual material, at least one electrode channel, and at least one bridge. The substrate has a first surface and a second surface. The first surface and the second surface are opposite to each other. The conductive residual material is formed on the second surface of the substrate. All of the first touch electrodes, the second touch electrodes, and the electrode channel are embedded in the substrate. The electrode channel is configured to electrically connect the second touch electrodes to each other. The bridge is disposed on the first surface of the substrate, and configured to electrically connect the first touch electrodes to each other. The first touch electrodes are isolated from the second touch electrodes.

27 Claims, 13 Drawing Sheets

(56) References Cited

U.S. PATENT DOCUMENTS

| | | | |
|---|---|---|---|
| 2015/0160767 A1* | 6/2015 | Song | G06F 3/0412 345/174 |
| 2015/0227244 A1* | 8/2015 | Edwards | G06F 3/044 345/174 |
| 2015/0253916 A1* | 9/2015 | Chien | G06F 3/0412 345/173 |
| 2015/0301646 A1* | 10/2015 | Caldwell | G06F 3/044 345/174 |
| 2015/0309615 A1* | 10/2015 | Liu | G06F 3/044 345/174 |
| 2015/0346853 A1* | 12/2015 | Liu | G06F 3/044 345/174 |
| 2015/0346878 A1* | 12/2015 | Liu | G09G 5/003 345/173 |

\* cited by examiner

TOUCH MODULE AND MANUFACTURING METHOD THEREOF

This application claims priority to China Application Serial Number 201410240249.X, filed May 30, 2014, which is herein incorporated by reference.

BACKGROUND OF THE INVENTION

Field of Invention

The present disclosure relates to an electronic device and a manufacturing method. More particularly, the present disclosure relates to a touch module and a manufacturing method thereof.

Description of Related Art

With advances in electronic technology, touch modules are widely used in various kinds of electronic devices, such as mobile phones and tablet computers.

A typical touch module can be, for example, disposed on a display screen, and include a plurality of touch electrodes. When an object (e.g., a finger or a stylus pen) approaches or touches the display screen, a corresponding touch electrode generates an electronic signal and transmits the electronic signal to a control circuit, such that touch sensing can be realized.

In a manufacturing process of the touch module, conductive material disposed between the touch electrodes is typically removed by an etching process, so as to pattern the touch electrodes and isolate the touch electrodes from each other. However, removing the conductive material disposed between the touch electrodes causes uneven refractive indexes of the touch module, resulting in adversely affecting the optical consistency in the appearance of the touch module.

SUMMARY OF THE INVENTION

Thus, in order to avoid uneven refractive indexes of a touch module, one aspect of the present disclosure is related to a touch module. In accordance with one embodiment of the present disclosure, the touch module includes a substrate, at least two first touch electrodes, at least two second touch electrodes, at least one conductive residual material, at least one electrode channel, and at least one bridge. The substrate has a first surface and a second surface, in which the first surface and the second surface are opposite to each other. All of the first touch electrodes, the second touch electrodes, and the electrode channel are embedded in the substrate. The electrode channel is configured to electrically connect the second touch electrodes to each other. The bridge is disposed on the first surface of the substrate, and configured to electrically connect the first touch electrodes to each other. The first touch electrodes are electrically isolated from the second touch electrodes.

In accordance with one embodiment of the present disclosure, heights of the first touch electrodes relative to the first surface of the substrate are different from heights of the second touch electrodes relative to the first surface of the substrate.

In accordance with one embodiment of the present disclosure, a difference between the heights of the first touch electrodes relative to the first surface of the substrate and the heights of the second touch electrodes relative to the first surface of substrate is substantially greater than 50 nanometers.

In accordance with one embodiment of the present disclosure, the first touch electrodes are exposed on the first surface of the substrate.

In accordance with one embodiment of the present disclosure, heights of the first touch electrodes relative to the first surface of the substrate are the same as heights of the second touch electrodes relative to the first surface of the substrate.

In accordance with one embodiment of the present disclosure, an orthogonal projection of the conductive residual material onto the first surface of the substrate is located among orthogonal projections of the first touch electrodes, the second touch electrodes, and the electrode channel onto the first surface of the substrate.

In accordance with one embodiment of the present disclosure, orthogonal projections of the conductive residual material, the first touch electrodes, the second touch electrodes, and the electrode channel onto the first surface of substrate are substantially not overlapped with each other.

In accordance with one embodiment of the present disclosure, a height of the conductive residual material relative to the first surface of the substrate is different from heights of the first touch electrodes, the second touch electrodes, and the electrode channel relative to the first surface of the substrate to cause the conductive residual material to be isolated from the first touch electrodes, the second touch electrodes, and the electrode channel.

In accordance with one embodiment of the present disclosure, a difference between the height of the conductive residual material relative to the first surface of the substrate and the heights of the first touch electrodes relative to the first surface of the substrate is substantially greater than 50 nanometers, and a difference between the height of the conductive residual material relative to the first surface of the substrate and the heights of the second touch electrodes relative to the first surface of the substrate is substantially greater than 50 nanometers.

In accordance with one embodiment of the present disclosure, a height of the electrode channel relative to the first surface of the substrate is the same as heights of the second touch electrodes relative to the first surface of the substrate.

In accordance with one embodiment of the present disclosure, the substrate includes at least two first contact holes disposed between the first touch electrodes and the first surface of the substrate. The bridge is electrically contacted to the first touch electrodes via the first contact holes.

In accordance with one embodiment of the present disclosure, embedding depths of the first touch electrodes or the second touch electrodes relative to the second surface of the substrate are substantially between 10 to 500 nanometers.

In accordance with one embodiment of the present disclosure, the first touch electrodes are disposed along a first direction, the second touch electrodes are disposed along a second direction, and the first direction is different from the second direction.

In accordance with one embodiment of the present disclosure, each of the second touch electrodes has a diamond shape.

In accordance with one embodiment of the present disclosure, the touch module further includes at least one trace disposed on the first surface of the substrate and electrically contacted to at least one of the first touch electrodes.

In accordance with one embodiment of the present disclosure, the substrate includes at least one second contact hole disposed between at least one of the first touch electrodes and the first surface of the substrate. The trace is electrically contacted to the at least one of the first touch electrodes via the second contact hole.

In addition, another aspect of the present disclosure is related to a manufacturing method of a touch module. In accordance with one embodiment of the present disclosure, the manufacturing method includes providing a substrate, in which the substrate has a first surface and a second surface, and the first surface and the second surface are opposite to each other; embedding at least two first touch electrodes, at least two second touch electrodes, and at least one electrode channel into the substrate, and forming at least one conductive residual material on the second surface of the substrate, in which the electrode channel is configured to electrically connect the second touch electrodes to each other; and providing at least one bridge on the first surface of the substrate, so as to electrically connect the first touch electrodes to each other. The first touch electrodes are electrically isolated from the second touch electrodes.

In accordance with one embodiment of the present disclosure, the step of embedding the at least two first touch electrodes, the at least two second touch electrodes, and the at least one electrode channel into the substrate, and forming the conductive residual material on the second surface of the substrate includes providing a first conductive material layer on the second surface of the substrate; and embedding a first embedding portion of the first conductive material layer into the substrate to separately form the first touch electrodes, the second touch electrodes, and the electrode channel, and retaining the first embedding portion of the first conductive material layer on the second surface of the substrate to form the conductive residual material.

In accordance with one embodiment of the present disclosure, the step of embedding the first embedding portion of the first conductive material layer into the substrate includes providing an embedding ink on the first embedding portion of the first conductive material layer, so as to cause the first embedding portion of the first conductive material layer to be embedded into the substrate from the second surface of the substrate.

In accordance with one embodiment of the present disclosure, the step of embedding the at least two first touch electrodes, the at least two second touch electrodes, and the at least one electrode channel into the substrate, and forming the conductive residual material on the second surface of the substrate includes providing a first conductive material layer on the second surface of the substrate; embedding a first embedding portion of the first conductive material layer into the substrate to a first height relative to the first surface of the substrate, so as to form a second conductive material layer, and retaining a first retention portion of the first conductive material layer on the second surface of the substrate, so as to form the conductive residual material; and embedding a second embedding portion of the second conductive material layer into the substrate to a second height relative to the first surface of the substrate, so as to form the first touch electrodes, and retaining a second retention portion of the second conductive material layer in the substrate at the first height relative to the first surface of the substrate, so as to form the second touch electrodes and the electrode channel.

In accordance with one embodiment of the present disclosure, the step of embedding the second embedding portion of the second conductive material layer into the substrate to the second height relative to the first surface of the substrate includes embedding the second embedding portion of the second conductive material layer into the substrate until the second embedding portion of the second conductive material layer is exposed on the first surface of the substrate.

In accordance with one embodiment of the present disclosure, the step of embedding the second embedding portion of the second conductive material layer into the substrate to the second height relative to the first surface of the substrate includes providing an embedding ink on the second surface of the substrate at a position corresponding to the second embedding portion of the second conductive material layer, so as to cause the second embedding portion of the second conductive material layer to be further embedded into the substrate to the second height relative to the first surface of the substrate.

In accordance with one embodiment of the present disclosure, the manufacturing method further includes forming at least two first contact holes between the first touch electrodes and the first surface of the substrate before the bridge is provided, such that the bridge can be electrically contacted to the first touch electrodes via the first contact holes.

In accordance with one embodiment of the present disclosure, the step of forming the first contact holes includes providing a mask on the first surface of the substrate and exposing at least two first opening portions of the substrate, and removing the at least two first opening portions of the substrate to form first contact holes.

In accordance with one embodiment of the present disclosure, the manufacturing method further includes providing at least one trace on the first surface of the substrate, wherein the trace is electrically contacted to the at least one of the first touch electrodes.

In accordance with one embodiment of the present disclosure, the manufacturing method further includes forming at least one second contact hole between the at least one of the first touch electrodes and the first surface of the substrate before the trace is provided, so as to electrically contact the trace to the at least one of the first touch electrodes via the second contact holes.

In accordance with one embodiment of the present disclosure, the step of forming the second contact holes includes providing a mask on the first surface of the substrate and exposing at least one second opening portion of the substrate, and removing the at least one second opening portion of the substrate to form the second contact holes.

In view of the above, through application of one embodiment described above, a touch module can be realized. By embedding touch electrodes into the substrate, the touch electrodes can be patterned and isolated from each other. As a result, patterning the touch electrodes by an etching process can be avoided, such that the problem of adversely affecting the optical consistency in the appearance of the touch module caused by uneven refractive indexes of the touch module is not encountered.

BRIEF DESCRIPTION OF THE DRAWINGS

FIGS. 1A-4A illustrate a manufacturing method of a touch module according to one embodiment of the present disclosure.

FIG. 1B-4B are sectional views of the touch module along lines A-A in FIGS. 1A-4A according to one embodiment of the present disclosure.

FIGS. 5A-8A illustrate a manufacturing method of a touch module according to one embodiment of the present disclosure.

FIG. 5B-8B are sectional views of the touch module along lines A-A in FIGS. 5A-8A according to one embodiment of the present disclosure.

FIGS. 9A-12A illustrate a manufacturing method of a touch module according to one embodiment of the present disclosure.

FIG. 9B-12B are sectional views of the touch module along lines A-A in FIGS. 9A-12A according to one embodiment of the present disclosure.

DETAILED DESCRIPTION OF THE INVENTION

Figure 1A:
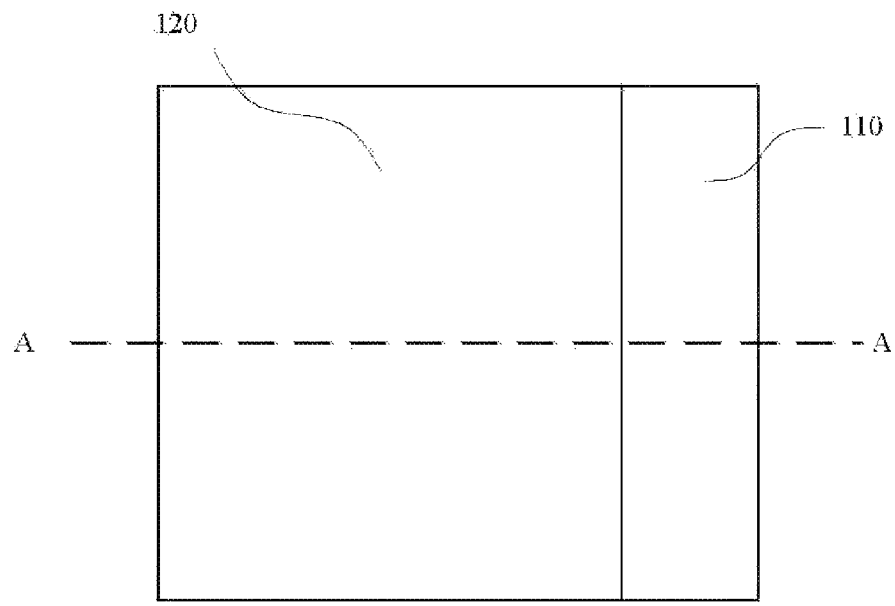

Reference will now be made in detail to the present embodiments of the present disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a manufacturing method of a touch module. In the following paragraphs, first, second, and third embodiments will be used as examples to describe details of the present disclosure. However, the disclosure is not limited to these embodiments. Other implementations are within the contemplated scope of the present disclosure.

First Embodiment

FIGS. 1A-4A illustrate a manufacturing method of a touch module 100 according to one embodiment of the present disclosure. FIG. 1B-4B are sectional views of the touch module 100 along lines A-A in FIGS. 1A-4A according to one embodiment of the present disclosure.

Figure 1B:
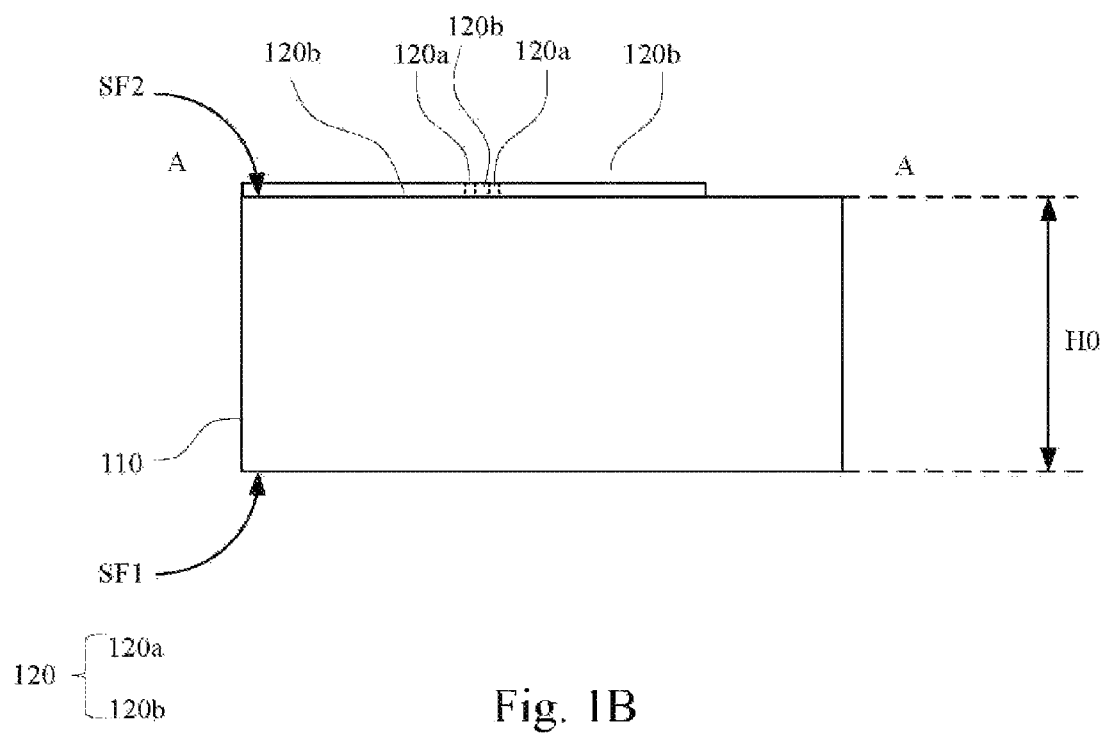

Reference is made to FIG. 1A and FIG. 1B. In the first step, a substrate 110 is provided. The substrate 110 has a surface SF1 and a surface SF2, in which the surface SF1 and the surface SF2 are opposite to each other. In one embodiment, a thickness of the substrate 110 (that is, H0) is substantially between 50 to 550 nanometers, but is not limited in this regard. In one embodiment, the substrate 110 can be made by using polymethyl methacrylate (PMMA), polycarbonate (PC), polyethylene terephthalate (PET), cyclo olefin polymer (COP), or another suitable high polymer material, but is not limited in this regard.

Subsequently, a first conductive material layer 120 is provided on the surface SF2 of the substrate 110. The first conductive material layer 120 includes a first retention portion 120a and a first embedding portion 120b. The first conductive material layer 120 can be made by using carbon nanotubes, nano metal traces, a conductive adhesive, conductive polymer, grapheme, nano metal, or another suitable conductive material, but is not limited in this regard.

Figure 2A:
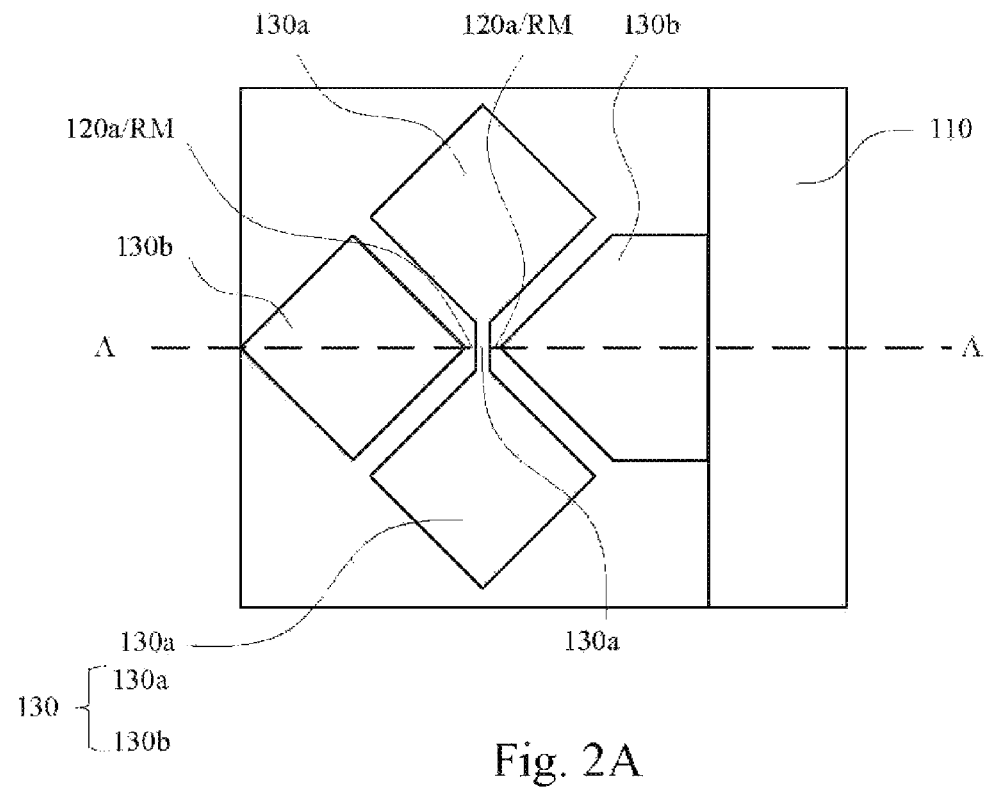
Figure 2B:
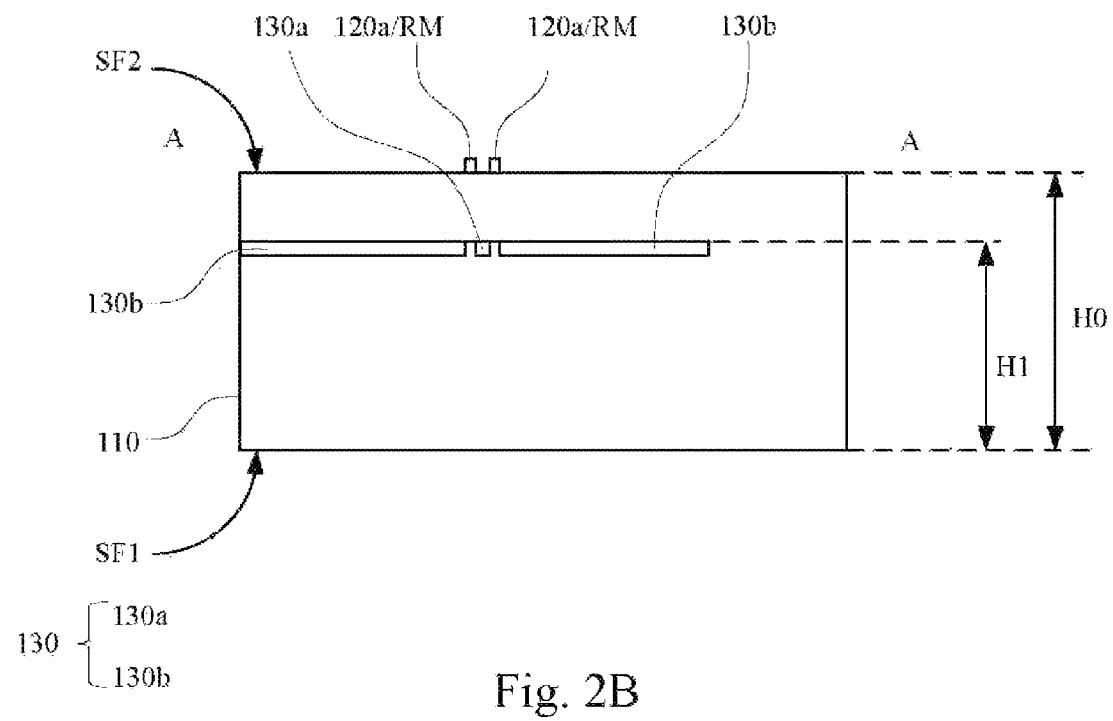

Reference is now made to FIG. 2A and FIG. 2B. In the second step, the first embedding portion 120b of the first conductive material layer 120 is embedded into the substrate 110 to a height H1 relative to the surface SF1 to form a second conductive material layer 130, and the first retention portion 120a of the first conductive material layer 120 is retained on the surface SF2 of the substrate 110 to form a conductive residual material RM. The height H1 is sufficiently different from the thickness H0 of the substrate 110 to cause the conductive residual material RM to be isolated from the second conductive material layer 130. In this embodiment, the second conductive material layer 130 includes a second retention portion 130a and a second embedding portion 130b.

In one embodiment, the first embedding portion 120b of the first conductive material layer 120 is embedded into the substrate 110 from the surface SF2 of the substrate 110 by providing a specific liquid (referred to as an embedding ink hereinafter) on the first embedding portion 120b of the first conductive material layer 120. That is, by providing the embedding ink on the first embedding portion 120b of the first conductive material layer 120, the corresponding portion of the substrate 110 swells, such that the conductive material of the first conductive material layer 120 can be permeated into the substrate 110 to allow the first embedding portion 120b to be embedded into the substrate 110. It is noted that the composition of the embedding ink corresponds to the material of the substrate 110, and any liquid that can make the substrate 110 swell to enable the conductive material to permeate into the substrate 110 can be used as the embedding ink. In one embodiment, a solubility parameter of the embedding ink is close to a solubility parameter of the material of the substrate 110.

It is noted that, in this embodiment, the embedding ink can be provided by spraying or printing. However, the present disclosure is not limited in this regard.

Figure 3A:
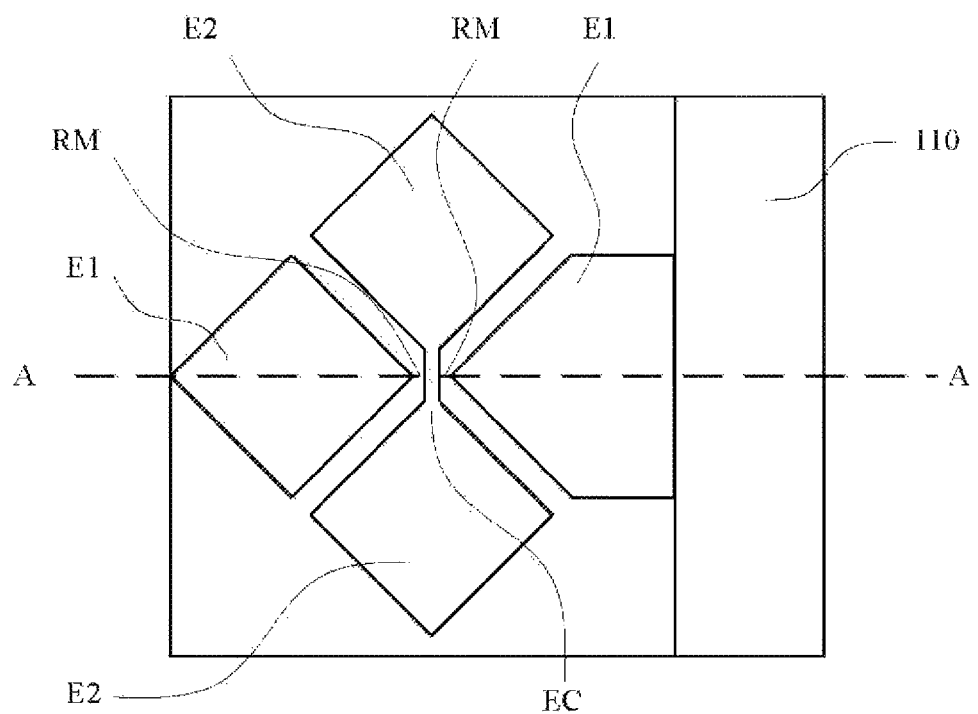
Figure 3B:
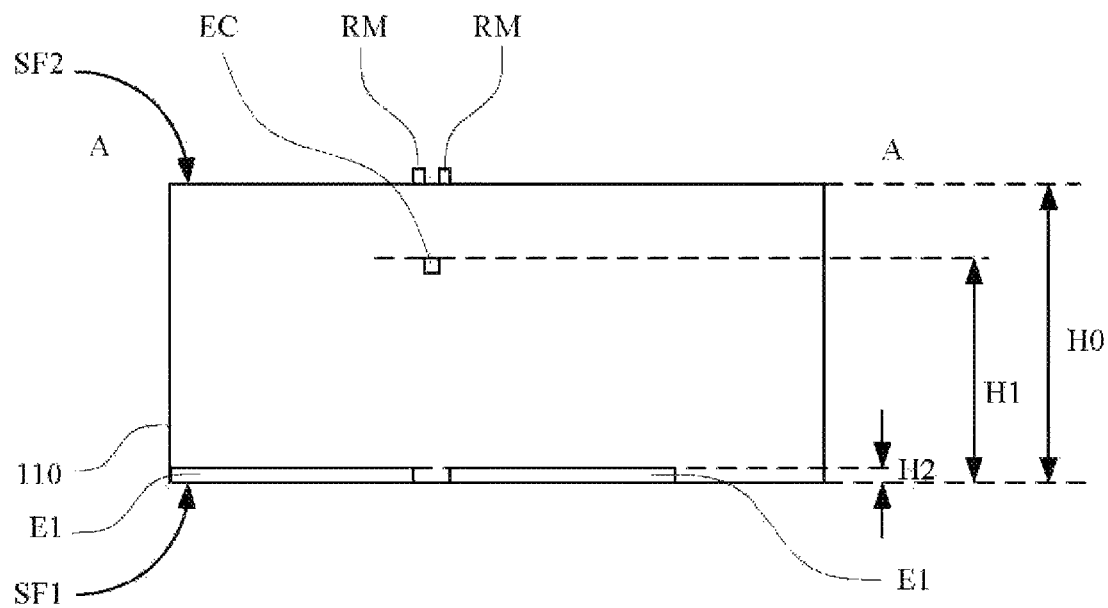

Reference is made next to FIG. 3A and FIG. 3B. In the third step, the second embedding portion 130b of the second conductive material layer 130 is embedded into the substrate 110 to a height H2 relative to the surface SF1 to form first touch electrodes E1, and the second retention portion 130*a* of the second conductive material layer 130 is retained on the substrate 110 at the height H1 relative to the surface SF1 to form second touch electrodes E2 and an electrode channel EC.

It is noted that, the phrase "conductive residual material RM" used herein refers to a conductive material which is not used to fabricate the first touch electrodes E1, the second touch electrodes E2, and the electrode channel EC in this manufacturing process. In one embodiment, an orthogonal projection of the conductive residual material RM onto the substrate 110 is located among orthogonal projections of the first touch electrodes E1, the second touch electrodes E2, and the electrode channel EC onto the substrate 110.

In one embodiment, the second embedding portion 130*b* of the second conductive material layer 130 is embedded into the substrate 110 until the second embedding portion 130*b* is exposed on the surface SF1 of the substrate 110.

In one embodiment, the second embedding portion 130*b* of the second conductive material layer 130 is embedded into the substrate 110 to the height H2 relative to the surface SF1 by providing the embedding ink on the surface SF2 of the substrate 110 at a position corresponding to the second embedding portion 130*b*. That is, by providing the embedding ink on the surface SF2 of the substrate 110 at the position corresponding to the second embedding portion 130*b*, a corresponding portion of the substrate 110 swells, such that the second embedding portion 130*b* of the second conductive material layer 130 can be further embedded into the substrate 110. It is noted that details of the embedding ink can be ascertained by referring to the previous paragraphs, and a description in this regard will not be repeated herein.

In this embodiment, the height H2 is different from the height H1. In one embodiment, a difference between the height H2 and the height H1 is substantially greater than 50 nanometers to cause the second touch electrodes E2 and the electrode channel EC with the height H1 to be electrically isolated from the first touch electrodes E1 with the height H2.

Figure 4A:
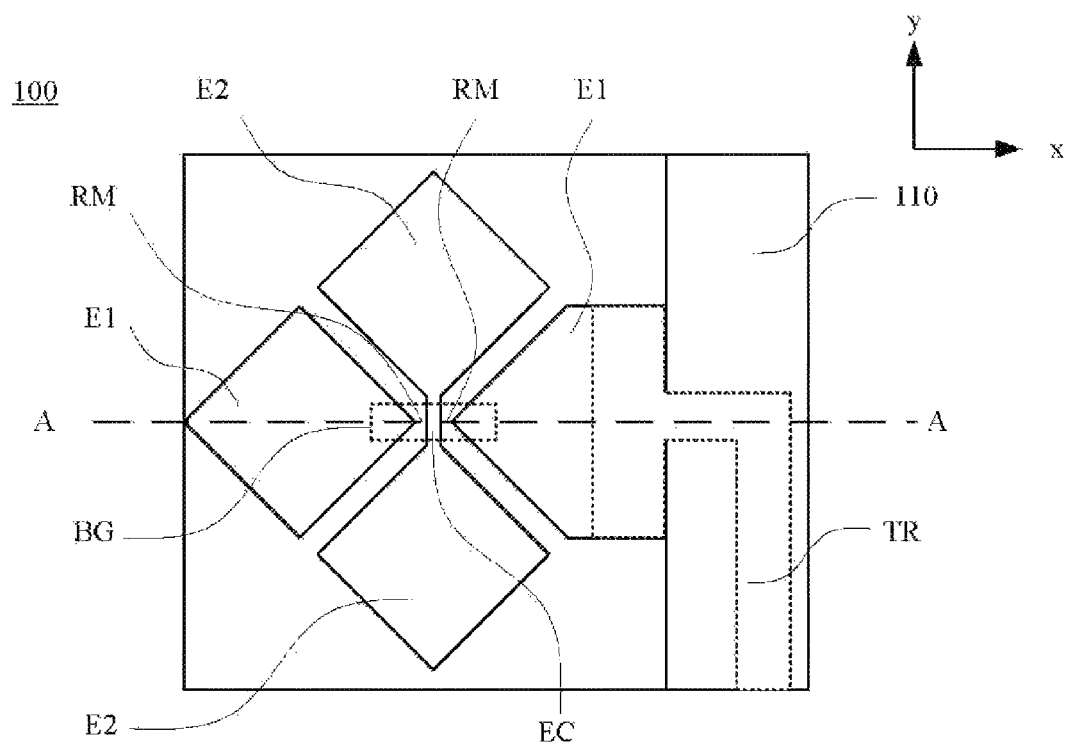
Figure 4B:
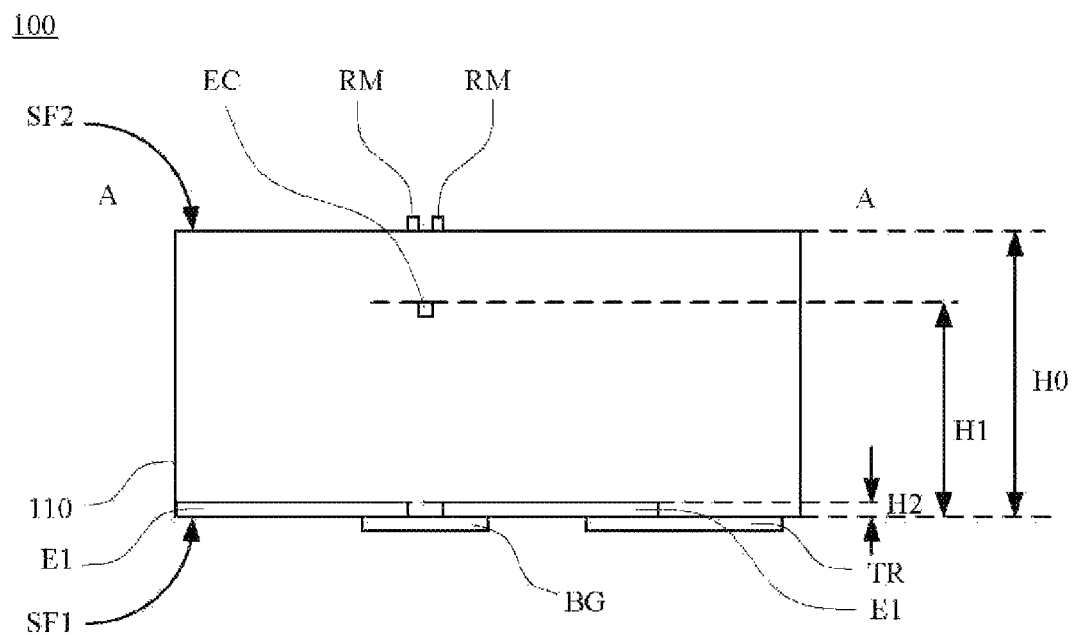

Reference is now made to FIG. 4A and FIG. 4B. In the fourth step, at least one bridge BG is provided on the surface SF1 of the substrate 110. The bridge BG is electrically contacted to different first touch electrodes E1 which are adjacent to each other and exposed on the surface SF1 of the substrate 110, such that these adjacent first touch electrodes E1 are electrically connected to each other. In addition, in the fourth step, at least one trace TR is provided on the first surface SF1 of the substrate 110. One end of the trace TR electrically contacts the first touch electrodes E1 on the surface SF1 of the substrate 110. The other end of the trace TR can be electrically connected to a touch control circuit (not shown), such that electronic signals generated by the first touch electrodes E1 can be transmitted back to the touch control circuit.

Through utilizing the manufacturing method described above, the touch module 100 can be realized. By patterning the first and second touch electrodes E1, E2 and the electrode channel EC with such an embedding process and instead of using an etching process, the problem of adversely affecting the optical consistency in the appearance of the touch module 100 caused by uneven refractive indexes of the touch module 100 can be avoided.

That is, by patterning the first and second touch electrodes E1, E2 and the electrode channel EC with such an embedding process, substantially no gap or overlap is present among the orthogonal projections of the first touch electrodes E1, the second touch electrodes E2, the electrode channel EC, and the conductive residual material RM onto the substrate 110. As a result, the problem of adversely affecting the optical consistency in the appearance of the touch module 100 caused by uneven refractive indexes of the touch module 100 can be avoided.

It should be noted that, in the description herein and throughout the claims that follow, the term "substantially" is used in association with values that may vary slightly and in association with slight deviations that may result from manufacturing processes, in which such minor errors do not change the properties relevant to the values and the characteristics of the elements. For example, manufacturing deviations of the first touch electrodes E1, the second touch electrodes E2, and the electrode channel EC of the touch module 100 may be caused by extrusions in the embedding process, such that there may exist minor gaps or overlaps among the orthogonal projections of the first touch electrodes E1, the second touch electrodes E2, the electrode channel EC, and the conductive residual material RM onto the substrate 110. However, such minor errors (e.g., the gaps and overlaps) caused by manufacturing processes are within the contemplated scope of the present disclosure.

In this embodiment, the second touch electrodes E2 are disposed along, for example, a y-axis in FIG. 4A. Two adjacent second touch electrodes E2 are electrically connected to each other via the electrode channel EC, and the heights of the second touch electrodes E2 relative to the surface SF1 of the substrate 110 are the same as the height of the electrode channel EC relative to the surface SF1 of the substrate 110.

In addition, the first touch electrodes E1 are disposed along, for example, an x-axis in FIG. 4A, in which the x-axis is perpendicular to the y-axis. Two adjacent first touch electrodes E1 are electrically connected to each other via the bridge BG.

In this embodiment, the heights of the first touch electrodes E1 and the second touch electrodes E2 relative to the surface SF1 of the substrate 110 are sufficiently different from the height of the conductive residual material RM relative to the surface SF1 of the substrate 110 to cause the conductive residual material RM to be electrically isolated from the first touch electrodes E1 and the second touch electrodes E2. In one embodiment, a difference between the height of the conductive residual material RM relative to the surface SF1 of the substrate 110 and the heights of the first touch electrodes E1 relative to the surface SF1 of the substrate 110 is substantially greater than 50 nanometers, and a difference between the height of the conductive residual material RM relative to the surface SF1 of the substrate 110 and the heights of the second touch electrodes E2 relative to the surface SF1 of the substrate 110 is substantially greater than 50 nanometers.

Furthermore, in this embodiment, each of the first touch electrodes E1 and the second touch electrodes E2 has a substantially diamond shape (except the first touch electrode E1 which electrically contacts the trace TR).

In one embodiment, a passive layer is disposed on the surface SF2 of the substrate 110, so as to protect or isolate the conductive residual material RM exposed on the substrate 110, and to prevent the conductive residual material RM from being peeled off.

In one embodiment, in order to avoid exposing any one of the first touch electrodes E1, the second touch electrodes E2, and the electrode channel EC on the surface SF2 of the substrate 110, the embedding depth (e.g., H0-H1) of the first touch electrodes E1, the second touch electrodes E2, and the electrode channel EC (e.g., the second touch electrodes E2) which is closest to the surface SF2 of the substrate 110 is substantially 10 to 500 nanometers relative to the surface SF2 of the substrate 110.

Second Embodiment

In the following paragraphs, a manufacturing method of a touch module 200 is provided in accordance with the second embodiment. The manufacturing method of the touch module 200 is substantially the same as the manufacturing method of the touch module 100 described above, and the main difference is that the first touch electrodes E1 of the touch module 200 are not exposed on the surface SF1 of the substrate 110. Thus, in the paragraphs below, a description of many aspects that are similar will not be repeated.

Referring back to FIG. 1A and FIG. 1A, in the first step, a substrate 110 is provided, and a first conductive material layer 120 is provided on the surface SF2 of the substrate 110. It is noted that details of the substrate 110 and the conductive material layer 120 can be ascertained by referring to the paragraphs described above, and a description in this regard will not be repeated herein.

Subsequently, referring to FIG. 2A and FIG. 2B, in the second step, the first embedding portion 120b of the first conductive material layer 120 is embedded into the substrate 110 to a height H1 relative to the surface SF1 to form a second conductive material layer 130, and the first retention portion 120a of the first conductive material layer 120 is retained on the surface SF2 of the substrate 110 to form a conductive residual material RM. The height H1 relative to the surface SF1 is sufficiently different from the thickness of the substrate 110 (that is, H0) to cause the conductive residual material RM to be isolated from the second conductive material layer 130. It is noted that details of the conductive residual material RM and the second conductive material layer 130 can be ascertained by referring to the paragraphs described above, and a description in this regard will not be repeated herein. In addition, details of the embedding process in this step can be ascertained by referring to the paragraphs described above, and a description in this regard will not be repeated herein.

Figure 5A:
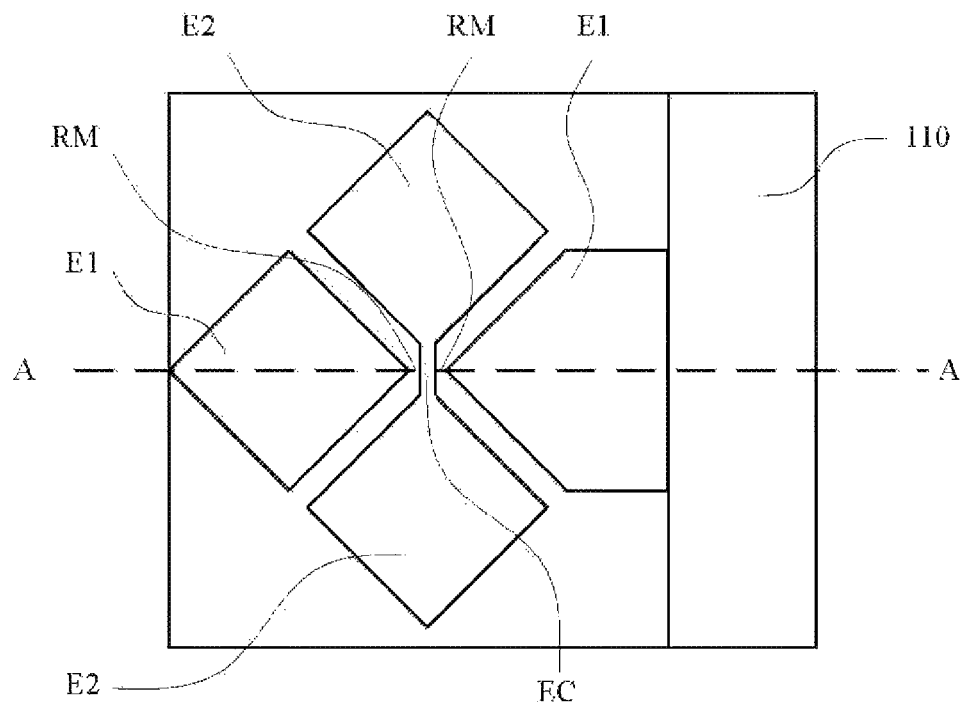
Figure 5B:
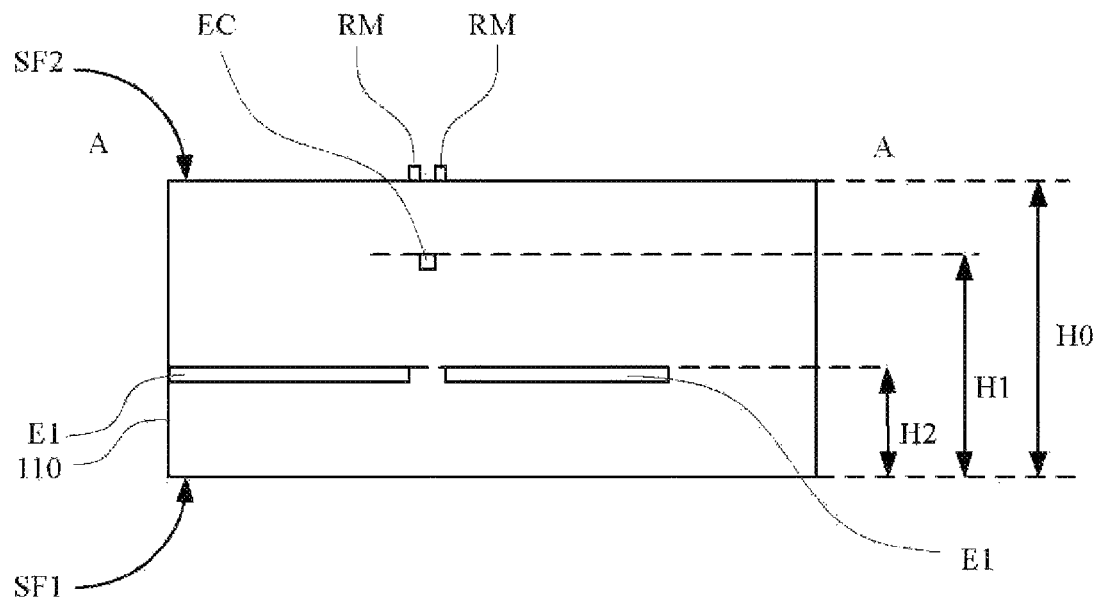

Reference is now made to FIG. 5A and FIG. 5B. In the third step, the second embedding portion 130b of the second conductive material layer 130 is embedded into the substrate 110 to a height H2 relative to the surface SF1 to form first touch electrodes E1, and the second retention portion 130a of the second conductive material layer 130 is retained in the substrate 110 at the height H1 relative to the surface SF1 to form second touch electrodes E2 and an electrode channel EC.

In this embodiment, the first touch electrodes E1 are not exposed on the surface SF1 of the substrate 110.

It is noted that, in other embodiments, it is also possible to embed the second embedding portion 130b of the second conductive material layer 130 into the substrate 110 to the height H2 relative to the surface SF1 to form the second touch electrodes E2 and the electrode channel EC, and retain the second retention portion 130a of the second conductive material layer 130 in the substrate 110 at the height H1 relative to the surface SF1 to form the first touch electrodes E1. However, the present disclosure is not limited in this regard.

In this embodiment, the height H2 is different from the height H1. In one embodiment, a difference between the height H2 and the height H1 is substantially greater than 50 nanometers to cause the second touch electrodes E2 and the electrode channel EC with the height H1 to be electrically isolated from the first touch electrodes E1 with the height H2.

Details of the embedding process in this step can be ascertained by referring to the paragraphs described above, and a description in this regard will not be repeated herein.

Figure 6A:
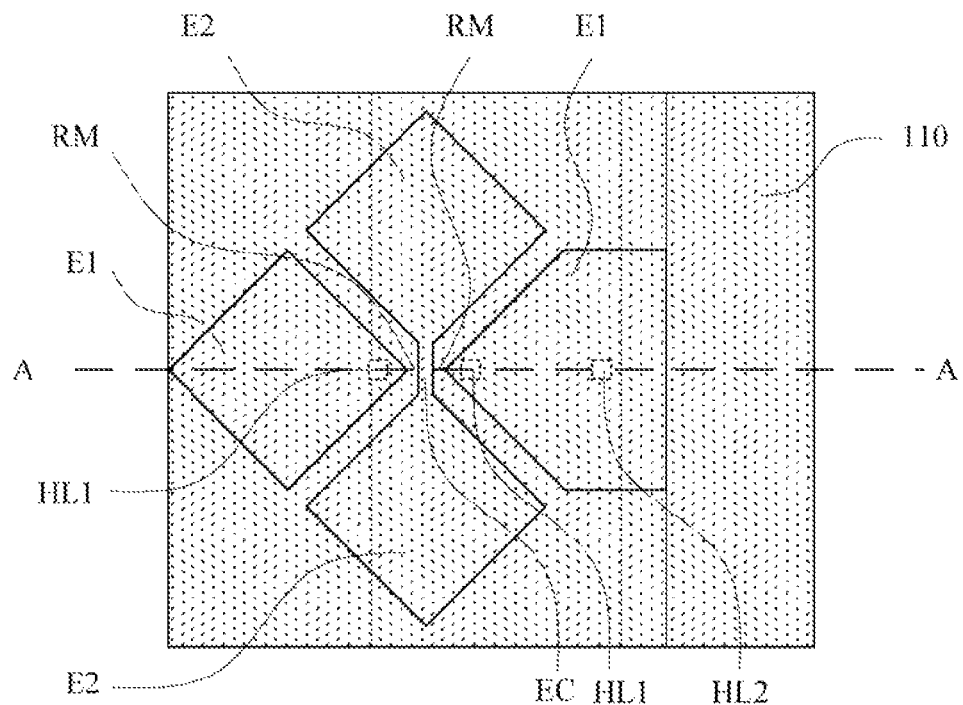
Figure 6B:
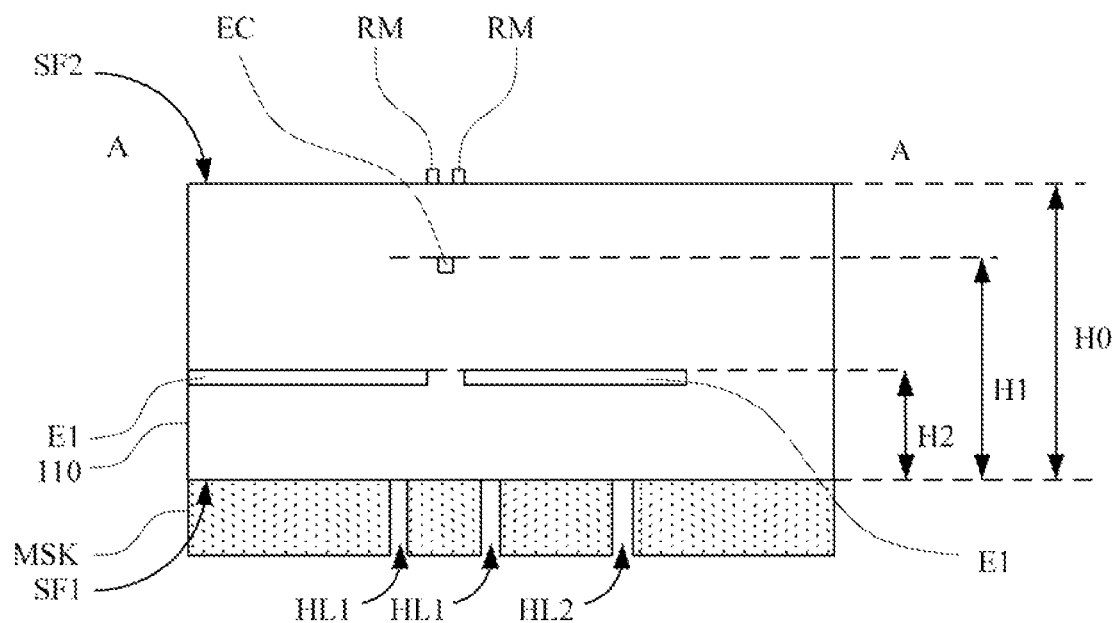

Reference is made next to FIG. 6A and FIG. 6B. In the fourth step, a mask MSK is provided on the surface SF1 of the substrate 110. The mask MSK exposes at least two first opening portions HL1 and at least one second opening portion HL2 of the substrate 110.

Figure 7A:
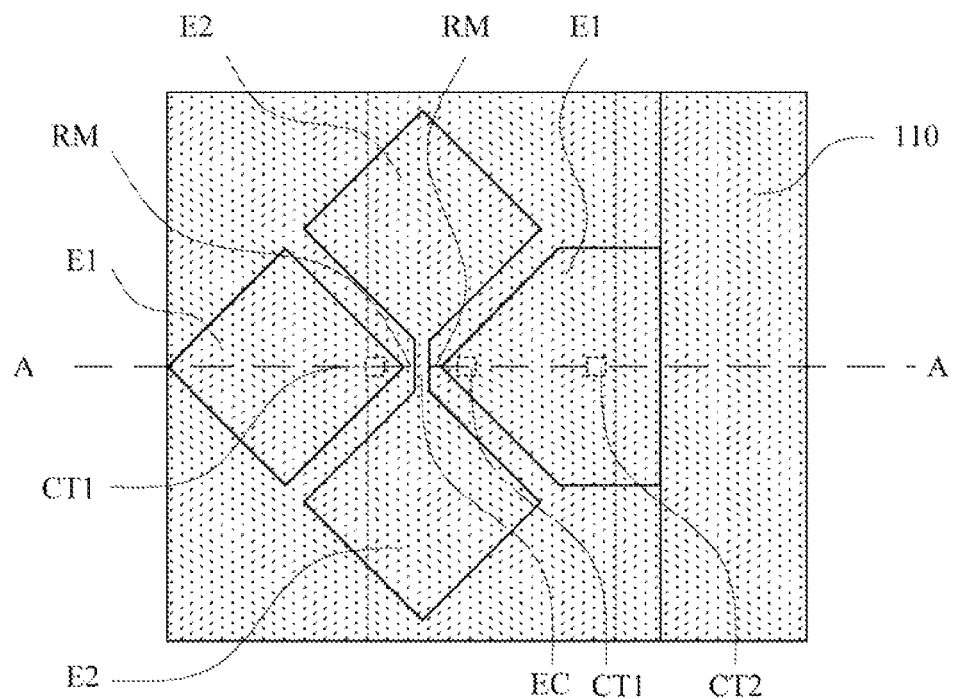
Figure 7B:
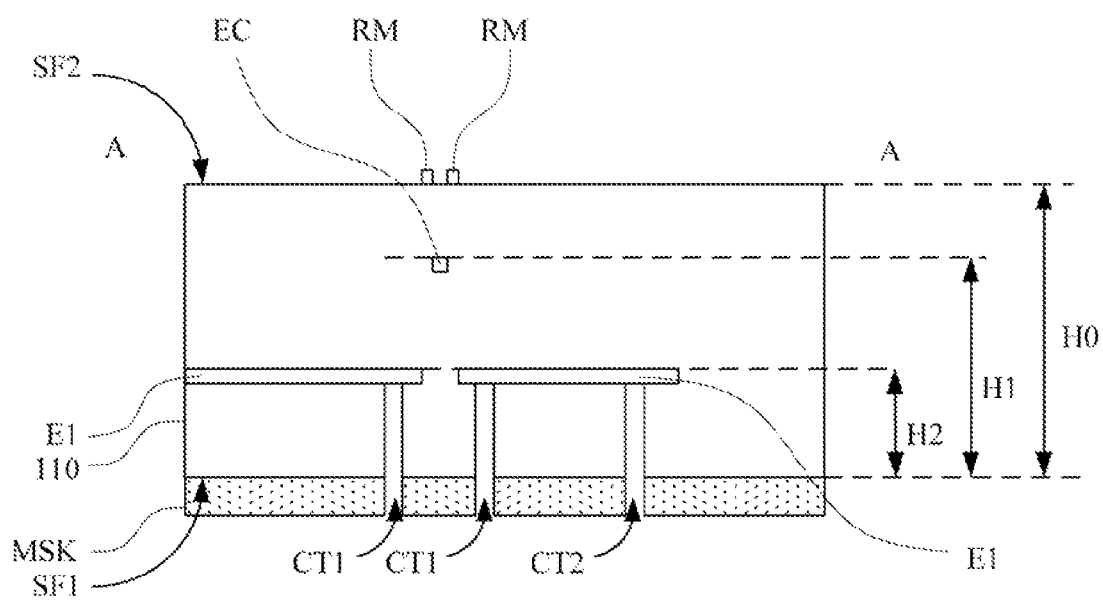

Reference is made now to FIG. 7A and FIG. 7B. In the fifth step, the first opening portions HL1 of the substrate 110 are removed (e.g., are etched), so that first contact holes CT1 are formed between the first touch electrodes E1 and the surface SF1 of the substrate 110. Moreover, the second opening portion HL2 is removed, so that a second contact hole CT2 is formed between the first touch electrodes E1 and the surface SF1 of the substrate 110. It is noted that, in this step, the mask MSK becomes thinner due to the etching process, but still remains present on the surface SF1 of the substrate 110. In another embodiment, in this step, the mask MSK may be completely removed.

Figure 8A:
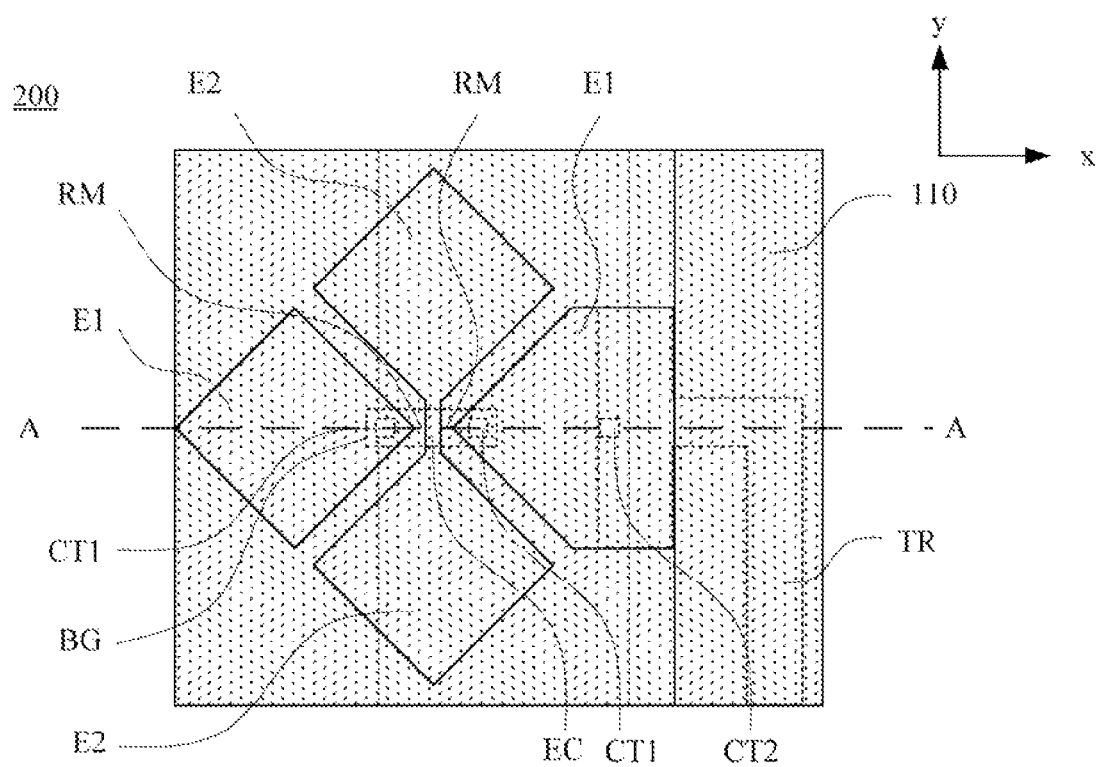
Figure 8B:
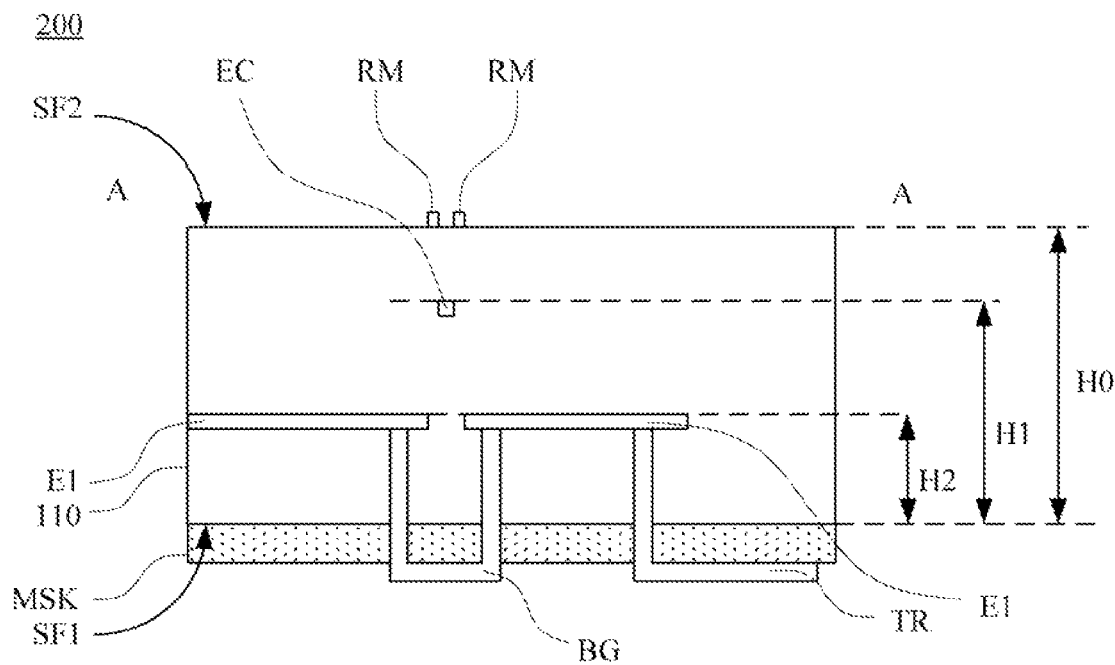

Reference is made now to FIG. 8A and FIG. 8B. In the sixth step, at least one bridge BG is provided on the surface SF1 of the substrate 110. The bridge BG electrically contacts different first touch electrodes E1 which are adjacent to each other via the first contact holes CT1, such that the first touch electrodes E1 are electrically connected to each other. In addition, in the sixth step, at least one trace TR is provided on the surface SF1 of the substrate 110, and the trace TR electrically contacts the first touch electrodes E1 via the second contact holes CT2, such that the trace TR can transmit an electronic signal of the first touch electrodes E1 to a control circuit (not shown).

Through utilizing the manufacturing method described above, the touch module 200 can be realized. By patterning the first and second touch electrodes E1, E2 and the electrode channel EC with such an embedding process and instead of using an etching process, the problem of adversely affecting the optical consistency in the appearance of the touch module 200 caused by uneven refractive indexes of the touch module 200 can be avoided.

Similarly, in this embodiment, substantially no gap or overlap is present among the orthogonal projections of the first touch electrodes E1, the second touch electrodes E2, the electrode channel EC, and the conductive residual material RM onto the substrate 110. As a result, the problem of adversely affecting the optical consistency in the appearance of the touch module 200 caused by uneven refractive indexes of the touch module 200 can be avoided.

In addition, in this embodiment, heights of the first touch electrodes E1, the second touch electrodes E2, and the conductive residual material RM relative to the surface SF1 of the substrate 110 are sufficiently different to cause the conductive residual material RM to be electrically isolated from the first and second touch electrodes E1, E2, and cause the first touch electrodes E1 to be electrically isolated from the second touch electrodes E2.

In this embodiment, two adjacent second touch electrodes E2 are electrically connected to each other via the electrode channel EC, and the heights of the second touch electrodes E2 relative to the surface SF1 of the substrate 110 are the same as the height of the electrode channel EC relative to the surface SF1 of the substrate 110. Two adjacent first touch electrodes E1 are electrically connected to each other via the bridge BG. The shapes and the directions of disposition of the first touch electrodes E1 and the second touch electrodes E2 can be ascertained by referring to the paragraphs described above, and a description in this regard will not be repeated herein.

In addition, in this embodiment, all of the first touch electrodes E1, the second touch electrodes E2, and the electrode channel EC are completely embedded into the substrate 110. That is, all of the first touch electrodes E1, the second touch electrodes E2, and the electrode channel EC are not exposed on the surface SF1 or SF2 of the substrate 110. As a result, it is not necessary for the touch module 200 to have an additional passive layer thereon to protect or isolate the first touch electrodes E1, the second touch electrodes E2, and the electrode channel EC, as would be necessary were these elements exposed on the surfaces SF1, SF2 of the substrate 110, such that the time and costs associated with manufacturing the touch module 200 can be decreased. In addition, due to the fact that all of the first touch electrodes E1, the second touch electrodes E2, and the electrode channel EC are completely embedded in the substrate 110, the subsequent manufacturing and assembly processes of the touch module 200 are facilitated.

In one embodiment, in order to avoid exposing any one of the first touch electrodes E1, the second touch electrodes E2, and the electrode channel EC on the surface SF2 of the substrate 110, the embedding depth (e.g., H0-H1) of the first touch electrodes E1, the second touch electrodes E2, and the electrode channel EC (e.g., the second touch electrodes E2) which is closest to the surface SF2 of the substrate 110 is substantially between 10 to 500 nanometers relative to the surface SF2 of the substrate 110.

In addition, in one embodiment, a passive layer is disposed on the surface SF2 of the substrate 110, so as to protect or isolate the conductive residual material RM exposed on the substrate 110, and to prevent the conductive residual material RM from being peeled off.

It is noted that, in this embodiment, the order of forming the first touch electrodes E1, the second touch electrodes E2, and the electrode channel EC can be changed according to actual requirements. However, the present disclosure is not limited in this regard.

Third Embodiment

In the following paragraphs, a manufacturing method of a touch module 300 is provided in accordance with the third embodiment. The manufacturing method of the touch module 300 is substantially the same as the manufacturing method of the touch module 100 and the touch module 200 described above, and the main difference is that heights of the first touch electrodes E1, the second touch electrodes E2, and the electrode channel EC of the touch module 300 relative to the surface SF1 of the substrate 110 are substantially the same. Thus, in the paragraphs below, a description of many aspects that are similar will not be repeated.

Referring back to FIG. 1A and FIG. 1A, in the first step, a substrate 110 is provided, and a first conductive material layer 120 is provided on the surface SF2 of the substrate 110. It is noted that details of the substrate 110 and the conductive material layer 120 can be ascertained by referring to the paragraphs described above, and a description in this regard will not be repeated herein.

Figure 9A:
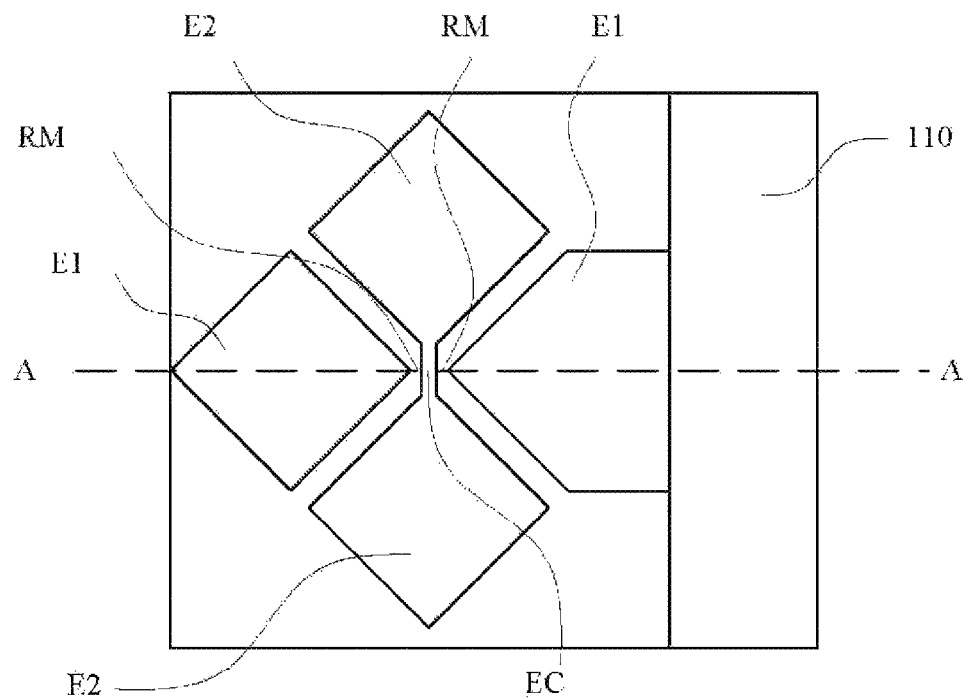
Figure 9B:
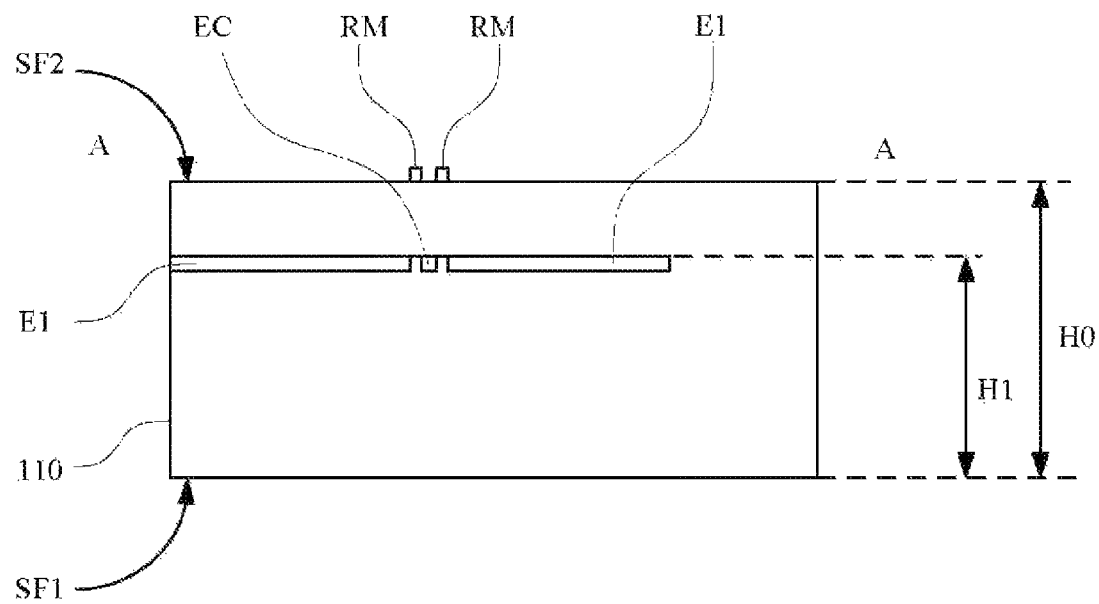

Reference is made next to FIG. 9A and FIG. 9B. In the second step, the first embedding portion 120b of a first conductive material layer 120 is embedded into the substrate 110 to separately form first touch electrodes E1, second touch electrodes E2, and an electrode channel EC, and the first retention portion 120a of the first conductive material layer 120 is retained on the surface SF2 of the substrate 110 to form a conductive residual material RM. The height H1 relative to the surface SF1 is sufficiently different from the thickness of the substrate 110 (that is, H0) to cause the conductive residual material RM to be isolated from the first touch electrodes E1, the second touch electrodes E2 and the electrode channel EC with the height H1. It is noted that details of the conductive residual material RM can be ascertained by referring to the paragraphs described above, and a description in this regard will not be repeated herein. In addition, details of the embedding process in this step can be ascertained by referring to the paragraphs described above, and a description in this regard will not be repeated herein.

Figure 10A:
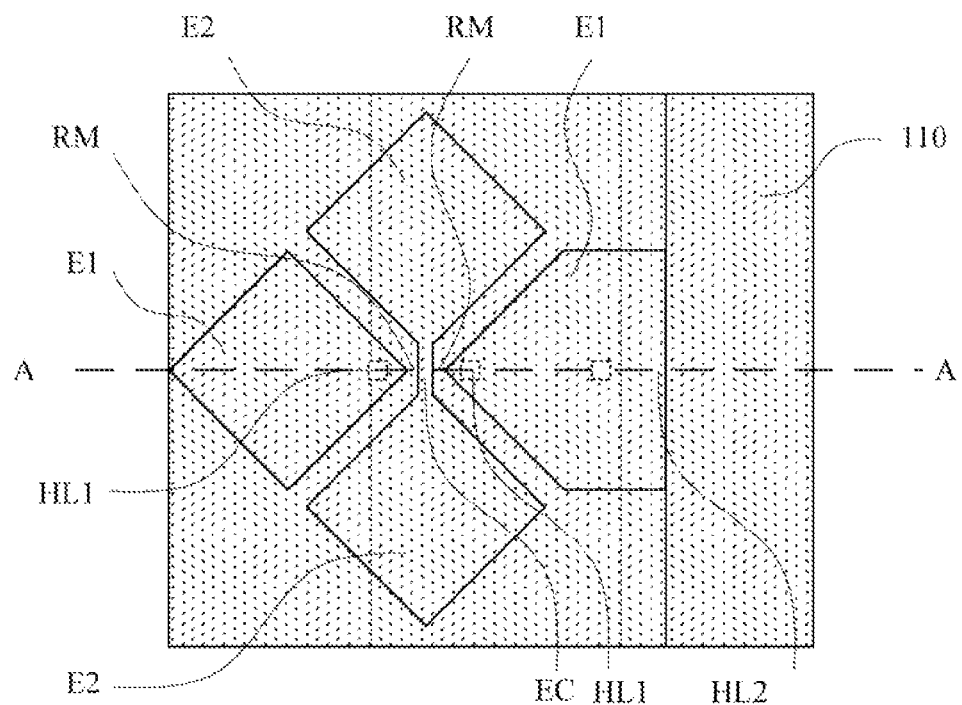
Figure 10B:
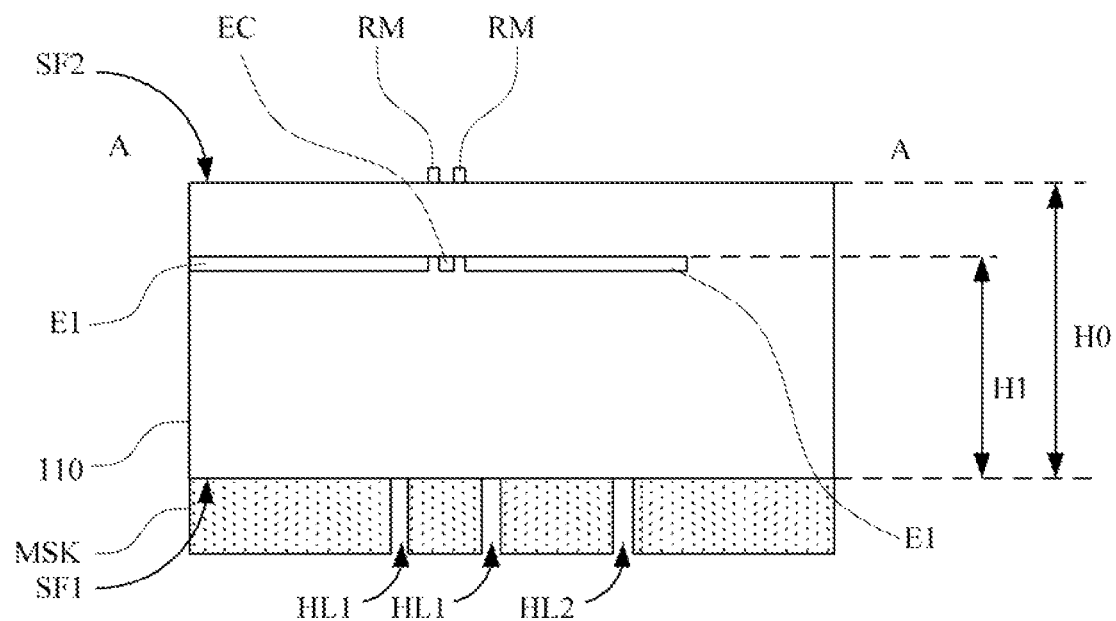

Subsequently, referring to FIG. 10A and FIG. 10B, in the third step, a mask MSK is provided on the surface SF1 of the substrate 110. The mask MSK exposes at least two first opening portions HL1 and at least one second opening portion HL2 of the substrate 110.

Figure 11A:
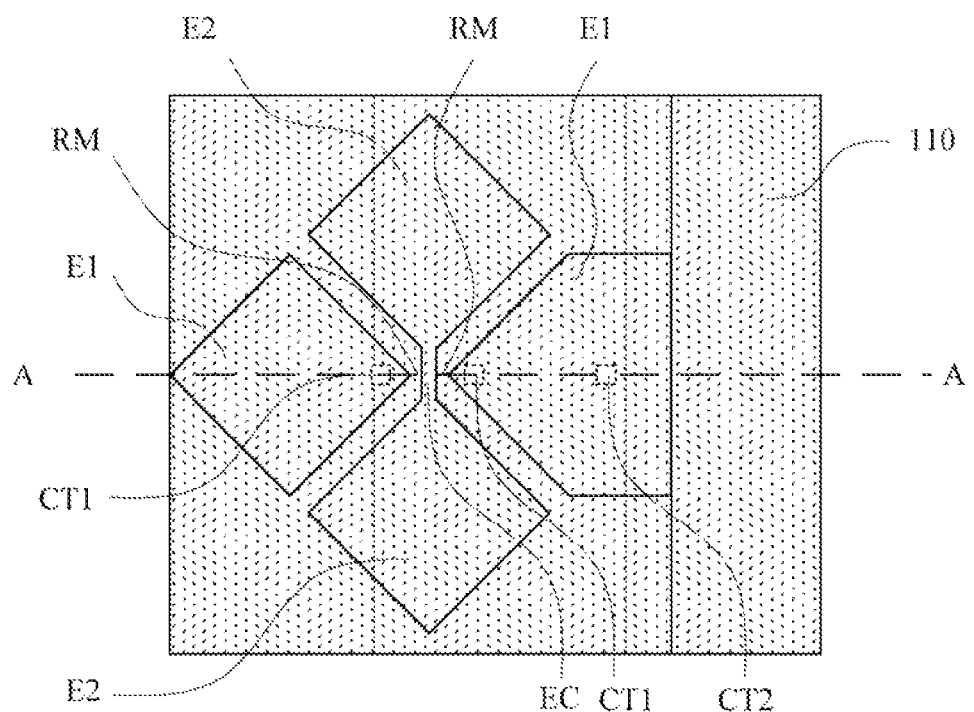
Figure 11B:
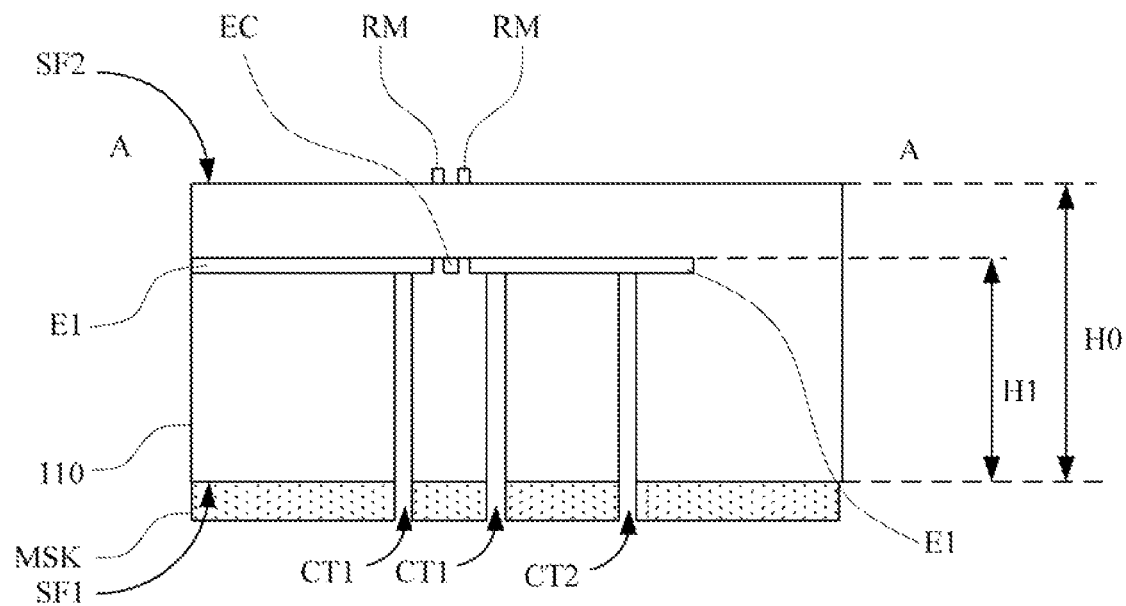

Reference is made now to FIG. 11A and FIG. 11B. In the fourth step, the first opening portions HL1 of the substrate 110 are removed (e.g., are etched), so that first contact holes CT1 are formed between the first touch electrodes E1 and the surface SF1 of the substrate 110. The second opening portion HL2 is removed, so that a second contact hole CT2 is formed between the first touch electrodes E1 and the surface SF1 of the substrate 110. It is noted that, in this step, the mask MSK becomes thinner due to the etching process, but still remains present on the surface SF1 of the substrate 110. In another embodiment, in this step, the mask MSK may be completely removed.

Figure 12A:
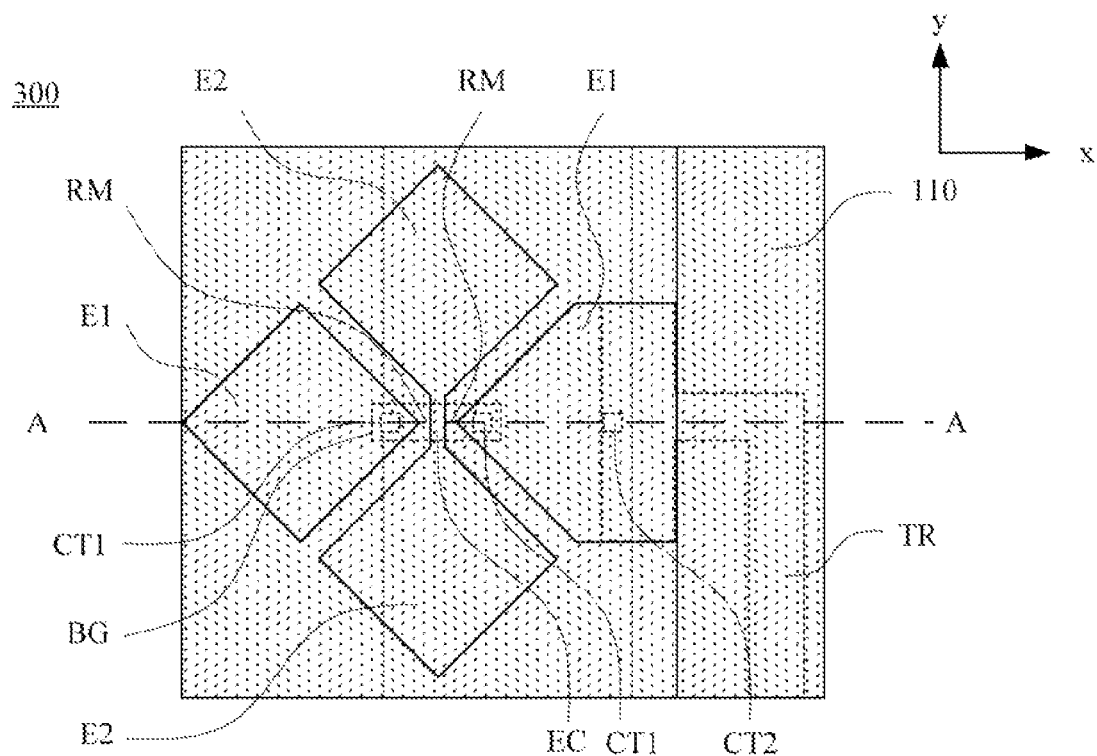
Figure 12B:
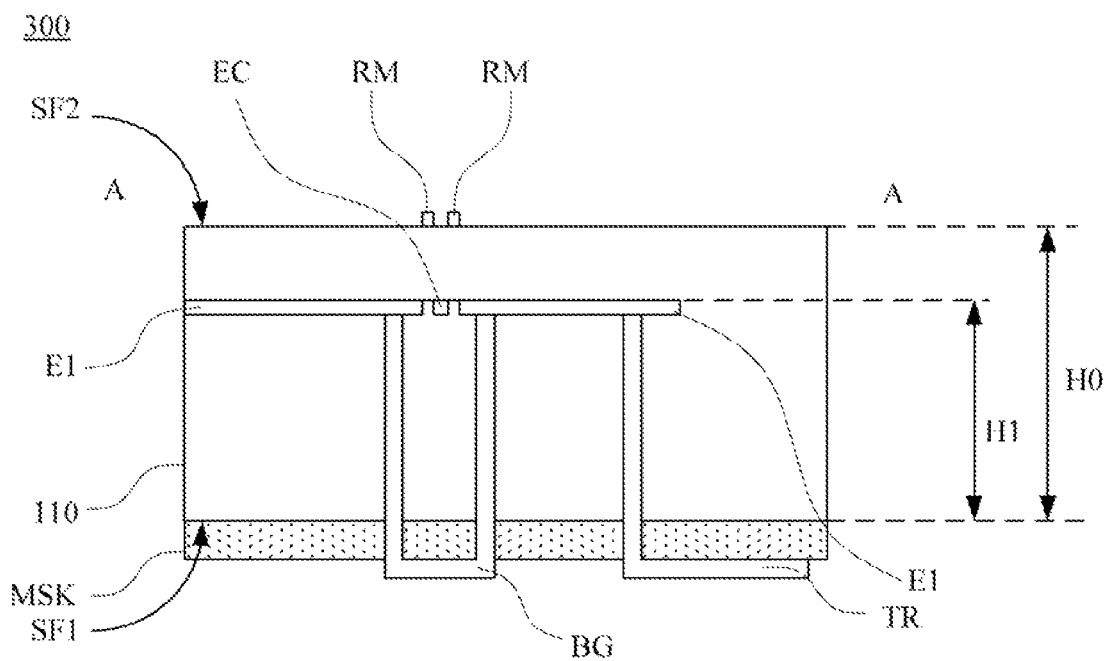

Reference is made now to FIG. 12A and FIG. 12B. In the fifth step, at least one bridge BG is provided on the surface SF1 of the substrate 110. The bridge BG electrically contacts different first touch electrodes E1 which are adjacent to each other via the first contact holes CT1, such that the first touch electrodes E1 are electrically connected to each other. In addition, in the fifth step, at least one trace TR is provided on the surface SF1 of the substrate 110, and the trace TR electrically contacts the first touch electrodes E1 via the second contact holes CT2, such that the trace TR is able to transmit an electronic signal of the first touch electrodes E1 to a control circuit (not shown).

Through utilizing the manufacturing method described above, the touch module 300 can be realized. By patterning the first and second touch electrodes E1, E2 and the electrode channel EC with such an embedding process and instead of using an etching process, the problem of adversely affecting the optical consistency in the appearance of the touch module 300 caused by uneven refractive indexes of the touch module 300 can be avoided.

Similarly, in this embodiment, substantially no gap or overlap is present among the orthogonal projections of the first touch electrodes E1, the second touch electrodes E2, the electrode channel EC, and the conductive residual material RM onto the substrate 110. As a result, the problem of adversely affecting the optical consistency in the appearance of the touch module 300 caused by uneven refractive indexes of the touch module 300 can be avoided.

In addition, in this embodiment, the first touch electrodes E1 and the second touch electrodes E2 have the same heights relative to the surface SF1 of the substrate 110, but the first touch electrodes E1 and the second touch electrodes E2 do not electrically contact each other. Thus, the first touch electrodes E1 are isolated from the second touch electrodes E2. In addition, a height of the conductive residual material RM relative to the surface SF1 of the substrate 110 is sufficiently different from the heights of the first touch electrodes E1 and the second touch electrodes E2 relative to the surface SF1 of the substrate 110 to cause the conductive residual material RM to be isolated from the first touch electrodes E1 and the second touch electrodes E2.

In this embodiment, two adjacent second touch electrodes E2 are electrically connected to each other via the electrode channel EC, and the heights of the second touch electrodes E2 relative to the surface SF1 of the substrate 110 are the same as the height of the electrode channel EC relative to the surface SF1 of the substrate 110. Moreover, two adjacent first touch electrodes E1 are electrically connected to each other via the bridge BG. The shapes and the directions of disposition of the first touch electrodes E1 and the second touch electrodes E2 can be ascertained by referring to the paragraphs described above, and a description in this regard will not be repeated herein.

In addition, in this embodiment, all of the first touch electrodes E1, the second touch electrodes E2, and the electrode channel EC are completely embedded into the substrate 110. That is, all of the first touch electrodes E1, the second touch electrodes E2, and the electrode channel EC are not exposed on the surface SF1 or the surface SF2 of the substrate 110. As a result, it is not necessary for the touch module 200 to have an additional passive layer thereon to protect or isolate the first touch electrodes E1, the second touch electrodes E2, and the electrode channel EC, as would be necessary were these elements exposed on the surfaces SF1, SF2 of the substrate 110, such that the time and costs associated with manufacturing the touch module 300 can be decreased. In addition, due to the fact that all of the first touch electrodes E1, the second touch electrodes E2, and the electrode channel EC are completely embedded in the substrate 110, the subsequent manufacturing and assembly processes of the touch module 300 are facilitated.

In one embodiment, in order to avoid exposing any one of the first touch electrodes E1, the second touch electrodes E2, and the electrode channel EC on the surface SF2 of the substrate 110, the embedding depth (e.g., H0-H1) of the first touch electrodes E1, the second touch electrodes E2, and the electrode channel EC (e.g., the second touch electrodes E2) which is closest to the surface SF2 of the substrate 110 is substantially between 10 to 500 nanometers relative to the surface SF2 of the substrate 110.

In addition, in one embodiment, a passive layer is disposed on the surface SF2 of the substrate 110, so as to protect or isolate the conductive residual material RM exposed on the substrate 110, and to prevent the conductive residual material RM from being peeled off.

Figure 13:
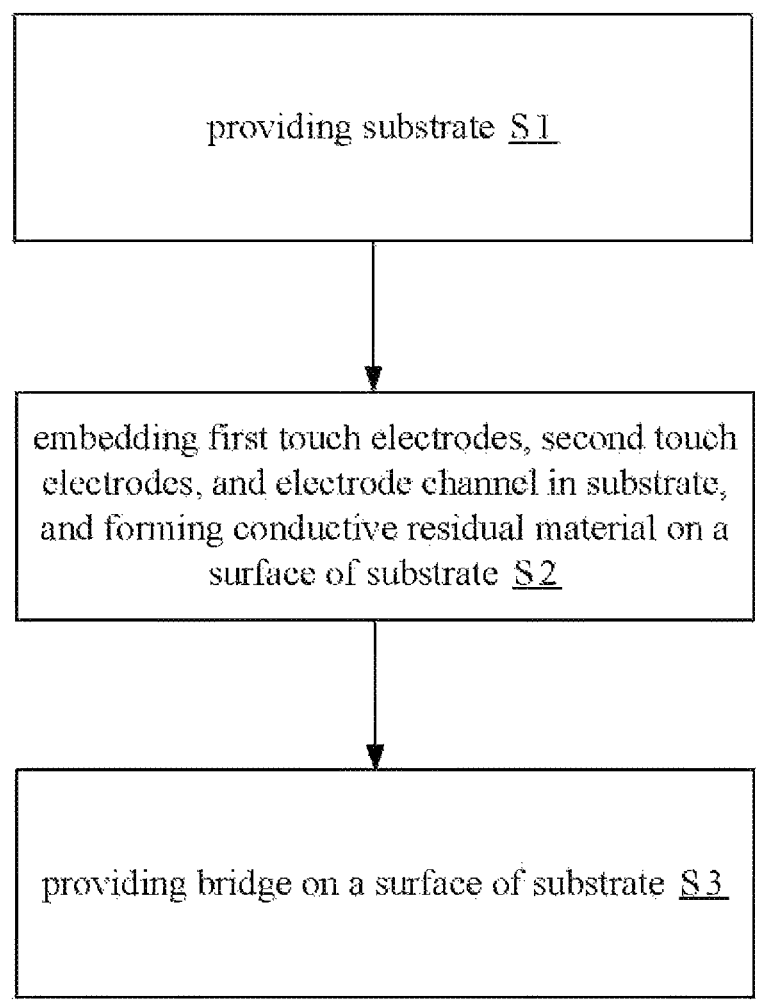
FIG. 13 is a flow chart of a manufacturing method of a touch module according to one embodiment of the present disclosure.

FIG. 13 is a flow chart of a manufacturing method 400 of a touch module according to one embodiment of the present disclosure. The manufacturing method 400 can be utilized to manufacture the touch module 100, the touch module 200, and the touch module 300 in the first, second, and third embodiments described above, but is not limited in this regard. In the paragraphs below, the touch module 100 in the first embodiment is taken as an example to describe the manufacturing method 400, but the present disclosure is not limited in this regard. The manufacturing method 400 includes the steps outlined below.

In step S1, a substrate 110 is provided.

In step S2, at least two first touch electrodes E1, at least two second touch electrodes E2, and at least one electrode channel EC are embedded into the substrate 110, and at least one conductive residual material RM is formed on the surface SF2 of the substrate 110. The electrode channel EC is configured to electrically connect the second touch electrodes E2 to each other.

In step S3, at least one bridge BG is provided on the surface SF1 of the substrate 110. The bridge BG is configured to electrically connect the first touch electrodes E1 to each other. The first touch electrodes E1 are electrically isolated from the second touch electrodes E2.

Through utilizing the manufacturing method 400 described above, the touch module 100 can be realized. By patterning the first and second touch electrodes E1, E2 and the electrode channel EC with such an embedding process and instead of using an etching process, the problem of adversely affecting the optical consistency in the appearance of the touch module 100 caused by uneven refractive indexes of the touch module 100 can be avoided.

In view of the above, one embodiment of the present disclosure is related to a touch module. The touch module includes a substrate, at least two first touch electrodes, at least two second touch electrodes, at least one conductive residual material, at least one electrode channel, and at least one bridge. The substrate has a first surface and a second surface, in which the first surface and the second surface are opposite to each other. All of the first touch electrodes, the second touch electrodes, and the electrode channel are embedded in the substrate. The electrode channel is configured to electrically connect the second touch electrodes to each other. The bridge is disposed on the first surface of the substrate, and is configured to electrically connect the first touch electrodes to each other. The first touch electrodes are electrically isolated from the second touch electrodes.

Another embodiment of the present disclosure is related to a manufacturing method of the touch module. The manufacturing method includes providing a substrate, in which the substrate has a first surface and a second surface, and the first surface and the second surface are opposite to each other; embedding at least two first touch electrodes, at least two second touch electrodes, and at least one electrode channel into the substrate, and forming at least one conductive residual material on the second surface of the substrate, in which the electrode channel is configured to electrically connect the second touch electrodes to each other; and providing at least one bridge on the first surface of the substrate, so as to electrically connect the first touch electrodes to each other. The first touch electrodes are electrically isolated from the second touch electrodes.

Through an application of one embodiment described above, patterning the touch electrodes by an etching process can be avoided, such that the problem of adversely affecting the optical consistency in the appearance of the touch module caused by uneven refractive indexes of the touch module can be avoided.

Although the present disclosure has been described in considerable detail with reference to certain embodiments thereof, other embodiments are possible. Therefore, the scope of the appended claims should not be limited to the description of the embodiments contained herein.

What is claimed is:

1. A touch module comprising:
   a substrate having a first surface and a second surface, wherein the first surface and the second surface are opposite to each other;
   at least two first touch electrodes embedded inside the substrate;
   at least two second touch electrodes embedded inside the substrate;

at least one conductive residual material formed on the second surface of the substrate;

at least one electrode channel embedded inside the substrate, and configured to electrically connect the second touch electrodes to each other; and at least one bridge disposed on the first surface of the substrate, and configured to electrically connect the first touch electrodes to each other;

wherein the first touch electrodes are electrically isolated from the second touch electrodes, wherein heights of the first touch electrodes relative to the first surface of the substrate are different from heights of the second touch electrodes relative to the first surface of the substrate.

2. The touch module as claimed in claim 1, wherein the heights of the first touch electrodes relative to the first surface of the substrate are different from a thickness of the substrate.

3. The touch module as claimed in claim 1, wherein a difference between the heights of the first touch electrodes relative to the first surface of the substrate and the heights of the second touch electrodes relative to the first surface of substrate is substantially greater than 50 nanometers.

4. The touch module as claimed in claim 1, wherein the first touch electrodes are exposed on the first surface of the substrate.

5. The touch module as claimed in claim 1, wherein the heights of the second touch electrodes relative to the first surface of the substrate are different from a thickness of the substrate.

6. The touch module as claimed in claim 1, wherein an orthogonal projection of the conductive residual material onto the first surface of the substrate is located among orthogonal projections of the first touch electrodes, the second touch electrodes, and the electrode channel onto the first surface of the substrate.

7. The touch module as claimed in claim 1, wherein orthogonal projections of the conductive residual material, the first touch electrodes, the second touch electrodes, and the electrode channel onto the first surface of substrate are substantially not overlapped with each other.

8. The touch module as claimed in claim 1, wherein a height of the conductive residual material relative to the first surface of the substrate is different from the heights of the first touch electrodes, the heights of the second touch electrodes, and a height of the electrode channel relative to the first surface of the substrate.

9. The touch module as claimed in claim 8, wherein a difference between the height of the conductive residual material relative to the first surface of the substrate and the heights of the first touch electrodes relative to the first surface of the substrate is substantially greater than 50 nanometers, and a difference between the height of the conductive residual material relative to the first surface of the substrate and the heights of the second touch electrodes relative to the first surface of the substrate is substantially greater than 50 nanometers.

10. The touch module as claimed in claim 1, wherein a height of the electrode channel relative to the first surface of the substrate is the same as the heights of the second touch electrodes relative to the first surface of the substrate.

11. The touch module as claimed in claim 1, wherein the substrate comprises:

at least two first contact holes disposed between the first touch electrodes and the first surface of the substrate, wherein the bridge is electrically contacted to the first touch electrodes via the first contact holes.

12. The touch module as claimed in claim 1, wherein embedding depths of the first touch electrodes or the second touch electrodes relative to the second surface of the substrate are substantially between 10 to 500 nanometers.

13. The touch module as claimed in claim 1, wherein the first touch electrodes are disposed along a first direction, the second touch electrodes are disposed along a second direction, and the first direction is different from the second direction.

14. The touch module as claimed in claim 1, wherein each of the second touch electrodes has a diamond shape.

15. The touch module as claimed in claim 1 further comprising:

at least one trace disposed on the first surface of the substrate and electrically contacted to at least one of the first touch electrodes.

16. The touch module as claimed in claim 15, wherein the substrate comprises:

at least one second contact hole disposed between at least one of the first touch electrodes and the first surface of the substrate, wherein the trace is electrically contacted to at least one of the first touch electrodes via the second contact hole.

17. An electronic device comprising:

a substrate having a first surface and a second surface, wherein the first surface and the second surface are opposite to each other;

at least two first touch electrodes embedded inside the substrate;

at least two second touch electrodes embedded inside the substrate;

at least one conductive residual material formed on the second surface of the substrate;

at least one electrode channel embedded inside the substrate, and configured to electrically connect the second touch electrodes to each other; and at least one bridge disposed on the first surface of the substrate, and configured to electrically connect the first touch electrodes to each other;

wherein the first touch electrodes are electrically isolated from the second touch electrodes, wherein heights of the first touch electrodes relative to the first surface of the substrate are different from a height of the electrode channel relative to the first surface of the substrate.

18. The electronic device as claimed in claim 17, wherein the heights of the first touch electrodes relative to the first surface of the substrate are different from a thickness of the substrate.

19. The electronic device as claimed in claim 17, wherein a difference between the heights of the first touch electrodes relative to the first surface of the substrate and heights of the second touch electrodes relative to the first surface of substrate is substantially greater than 50 nanometers.

20. The electronic device as claimed in claim 17, wherein the first touch electrodes are exposed on the first surface of the substrate.

21. The electronic device as claimed in claim 17, wherein heights of the second touch electrodes relative to the first surface of the substrate are different from a thickness of the substrate.

22. The electronic device as claimed in claim 17, wherein the substrate comprises:

at least two first contact holes disposed between the first touch electrodes and the first surface of the substrate, wherein the bridge is electrically contacted to the first touch electrodes via the first contact holes.

23. The electronic device as claimed in claim 17, wherein embedding depths of the first touch electrodes or the second touch electrodes relative to the second surface of the substrate are substantially between 10 to 500 nanometers.

24. The electronic device as claimed in claim 17, wherein the first touch electrodes are disposed along a first direction, the second touch electrodes are disposed along a second direction, and the first direction is different from the second direction.

25. The electronic device as claimed in claim 17, wherein each of the second touch electrodes has a diamond shape.

26. The electronic device as claimed in claim 17 further comprising:
  at least one trace disposed on the first surface of the substrate and electrically contacted to at least one of the first touch electrodes.

27. An electronic device comprising:
  a substrate having a first surface and a second surface, wherein the first surface and the second surface are opposite to each other;
  at least two first touch electrodes embedded inside the substrate;
  at least two second touch electrodes embedded inside the substrate;
  at least one conductive residual material formed on the second surface of the substrate;
  at least one electrode channel embedded inside the substrate, and configured to electrically connect the second touch electrodes to each other; and
  at least one trace disposed on the first surface of the substrate and electrically contacted to at least one of the first touch electrodes;
  wherein the first touch electrodes are electrically isolated from the second touch electrodes, wherein heights of the first touch electrodes relative to the first surface of the substrate are different from heights of the second touch electrodes relative to the first surface of the substrate.

* * * * *